(12) United States Patent
Webb et al.

(10) Patent No.: US 10,199,841 B2
(45) Date of Patent: Feb. 5, 2019

(54) SYSTEM AND METHOD FOR PROTECTING ENERGY STORAGE SYSTEMS FROM OVERCURRENT CONDITIONS

(71) Applicant: General Electric Company, Schenectady, NY (US)

(72) Inventors: Joshua Paul Webb, Schenectady, NY (US); David E. James, Clifton Park, NY (US); Kenneth Rush McClellan, Jr., Ballston Spa, NY (US); Mark Gotobed, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 14/975,936

(22) Filed: Dec. 21, 2015

(65) Prior Publication Data
US 2017/0179739 A1  Jun. 22, 2017

(51) Int. Cl.
*H02J 7/00* (2006.01)
*H02J 3/32* (2006.01)
*H02J 3/38* (2006.01)
*H02J 7/02* (2016.01)
*H02J 7/04* (2006.01)
*H02J 7/34* (2006.01)
*H02J 7/35* (2006.01)

(52) U.S. Cl.
CPC .............. *H02J 7/0029* (2013.01); *H02J 3/32* (2013.01); *H02J 3/382* (2013.01); *H02J 7/008* (2013.01); *H02J 7/0013* (2013.01); *H02J 7/0021* (2013.01); *H02J 7/0026* (2013.01); *H02J 7/0047* (2013.01); *H02J 7/0055* (2013.01); *H02J 7/027* (2013.01); *H02J 7/045* (2013.01); *H02J 7/34* (2013.01); *H02J 7/345* (2013.01); *H02J 7/35* (2013.01); *H02J 2007/005* (2013.01); *H02J 2007/0037* (2013.01); *H02J 2007/0039* (2013.01); *Y02E 70/30* (2013.01)

(58) Field of Classification Search
CPC ......... H02J 7/007; H02J 7/0013; H02J 7/0029
USPC ................................. 320/116–119, 126, 145
See application file for complete search history.

(56) References Cited

U.S. PATENT DOCUMENTS

| | | | |
|---|---|---|---|
| 2003/0122530 A1* | 7/2003 | Hikita | G05F 1/573 323/285 |
| 2004/0138785 A1* | 7/2004 | Emori | H02J 7/0016 700/286 |

(Continued)

*Primary Examiner* — Zixuan Zhou
(74) *Attorney, Agent, or Firm* — Dority & Manning, P.A.

(57) ABSTRACT

The present disclosure is directed to a system and method for controlling an energy storage system. The energy storage system includes a plurality of battery strings connected in parallel with the battery strings having a plurality of batteries connected in series. The method includes determining, via a controller, one or more operating parameters of the energy storage system. The method also includes determining, via the controller, a maximum current rating of one or more of the battery strings. Another step includes estimating, via the controller, a voltage range for the one or more battery strings as a function of the one or more operating parameters and the maximum current rating. The method also includes dynamically controlling the one or more battery strings based on the voltage range so as to prevent over-current recharge or discharge of the parallel battery strings.

19 Claims, 5 Drawing Sheets

(56) References Cited

U.S. PATENT DOCUMENTS

2006/0103348 A1* 5/2006 Melichar ............ G01R 31/3651
                                                    320/116
2014/0247014 A1* 9/2014 Nishikawa ............ H01M 10/44
                                                    320/126

* cited by examiner

SYSTEM AND METHOD FOR PROTECTING ENERGY STORAGE SYSTEMS FROM OVERCURRENT CONDITIONS

FIELD OF THE INVENTION

The present subject matter relates generally to energy storage systems and, more particularly, to systems and methods for protecting energy storage systems from overcurrent conditions using dynamic voltage limit control.

BACKGROUND OF THE INVENTION

Battery packs containing one or more batteries or cells are used in many applications including but not limited to telecommunications, grid, mobile, and/or any other suitable industries. In such applications, a plurality of battery packs are commonly connected in parallel to form a parallel battery string system. In such a system, a controller constrains operation of the battery strings based upon the current rating provided by the BMS. The current rating is typically determined by multiplying the rating of the individual battery strings by the number of operational strings which are connected in the system. Thus, a system level current limit for the power system can be easily determined and set for the system to operate within.

Due to the nature of a parallel-string energy storage system, individual strings can disconnect for various reasons. For example, individual strings may disconnect from the system due to over/under temperatures, over currents, over/under voltages, control failures, or similar. If individual strings disconnect and the power system is not given an updated current limit, the system will continue operating at the previously set current rating which can recharge/discharge the remaining strings above their design. In the case of a controls failure or a communications issue, the previously set current rating may lead to equipment damage and/or failure.

In view of the aforementioned issues, it is desirable to provide an improved system and method for protecting parallel-string energy storage systems from overcurrent conditions caused by a static current rating. Thus, the present disclosure is directed to a system and method for protecting parallel-string energy storage systems from overcurrent conditions by using dynamic voltage limit control.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for controlling an energy storage system. The energy storage system includes a plurality of battery strings connected in parallel with the battery strings having a plurality of batteries connected in series. The method includes determining, via a controller, one or more operating parameters of the energy storage system. The method also includes determining, via the controller, a maximum current rating of one or more of the battery strings. Another step includes estimating, via the controller, a voltage range for the one or more battery strings as a function of the one or more operating parameters and the maximum current rating. The method also includes dynamically controlling the one or more battery strings based on the voltage range so as to prevent over-current recharge or discharge of the parallel battery strings.

In one embodiment, the operating parameters may include one or more of the following: voltage, current, the maximum current rating, and/or one or more model parameters such as open circuit voltage, state-of-charge (SOC), series resistance, or similar. Thus, model parameters may include any estimations that may be used as a constant or computed value as a function of one or more inputs. For example, in certain embodiments, the model parameters may be estimated using mathematical functions and/or lookup tables.

In additional embodiments, the step of determining one or more operating parameters of the energy storage system may include estimating the open circuit voltage and/or the resistance of one or more of the battery strings using a multi-point interpolation model based on a state-of-charge (SOC) of one or more of the battery strings. Alternatively, the open circuit voltage and/or the resistance may be estimated using any other suitable methods and/or models.

In another embodiment, the step of determining the maximum current rating of the one or more battery strings may include determining the maximum current rating based on battery system constraints and/or wire ratings. More specifically, in certain embodiments, the battery system constraints may include a battery fuse rating, a conductor capacity, a battery rating, or similar.

In further embodiments, the step of determining the voltage range for the one or more battery strings as a function of the one or more operating parameters and the maximum current rating may include determining a discharge voltage limit as a function of the open circuit voltage, the resistance, and the maximum current rating, and determining a recharge voltage limit as a function of the open circuit voltage, the resistance, and the maximum current rating.

More specifically, in certain embodiments, the step of determining the discharge voltage limit as a function of the one or more operating parameters and the maximum current rating may include multiplying the resistance by the maximum current rating to obtain a multiplied value, and subtracting the multiplied value from the open circuit voltage. In additional embodiments, the step of determining the recharge voltage limit as a function of the open circuit voltage, the resistance, and the maximum current rating may include multiplying the resistance by the maximum current rating to obtain a multiplied value, and adding the multiplied value to the open circuit voltage.

In yet another embodiment, the step of dynamically controlling the one or more battery strings based on the voltage range so as to prevent over-current recharge or discharge of the parallel string energy storage system may include dynamically adjusting a voltage range setting of the one or more battery strings based on the voltage range.

In another embodiment, the plurality of batteries may include lithium ion batteries, sodium nickel chloride batteries, sodium sulfur batteries, nickel metal hydride batteries, nickel cadmium batteries, fuel cells, or similar.

In another aspect, the present disclosure is directed to a method for controlling an energy storage system. The energy storage system includes a plurality of battery strings connected in parallel with each of the battery strings having a plurality of batteries connected in series. The method includes operating the energy storage system based on an initial current rating. The method also includes estimating, via a controller, an open circuit voltage and a resistance of one or more of the battery strings during operation. Another step includes determining, via the controller, a maximum current rating of the one or more battery strings during operation. A further step includes determining, via the controller, a voltage range for the one or more battery strings as a function of the open circuit voltage, the resistance, and the maximum current rating. The method also includes dynamically adjusting the initial current rating of the one or more battery strings based on the voltage range so as to prevent over-current recharge or discharge of the parallel battery strings. It should be understood that the method may further include any of the additional features and/or steps as described herein.

In yet another aspect, the present disclosure is directed to an improved energy storage system. The energy storage system includes a plurality of battery strings connected in parallel. Each of the battery strings includes a plurality of batteries connected in series. The energy storage system also includes a controller communicatively coupled to the plurality of battery strings and configured to perform one or more operations. More specifically, the operations may include determining one or more operating parameters of the energy storage system, determining a maximum current rating of one or more of the battery strings based on one or more battery system constraints, determining a voltage range for the one or more battery strings as a function of the open circuit voltage, the resistance, and/or the maximum current rating, and dynamically controlling the battery string(s) based on the voltage range so as to prevent over-current recharge or discharge of the parallel battery strings. It should be understood that the system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling an energy storage system, particularly a system having a plurality of battery strings connected in parallel. The system includes a controller configured to estimate one or more operational parameters (e.g. an open circuit voltage and a resistance) of the battery string(s), as well as a maximum current rating of the battery string(s). The controller is also configured to determine a voltage range for the battery string(s) as a function of the operational parameters and/or the maximum current rating. Thus, the system of the present disclosure is configured to dynamically control the battery string(s) based on the voltage range so as to prevent over-current recharge or discharge of the parallel battery strings.

The present disclosure provides many advantages not present in the prior art. For example, the energy storage system of the present disclosure provides a longer battery life over conventional systems. Accordingly, the energy storage system of the present disclosure provides higher system availability and more robust control system. Thus, the present disclosure provides a more reliable and safer system over conventional systems.

Figure 1:
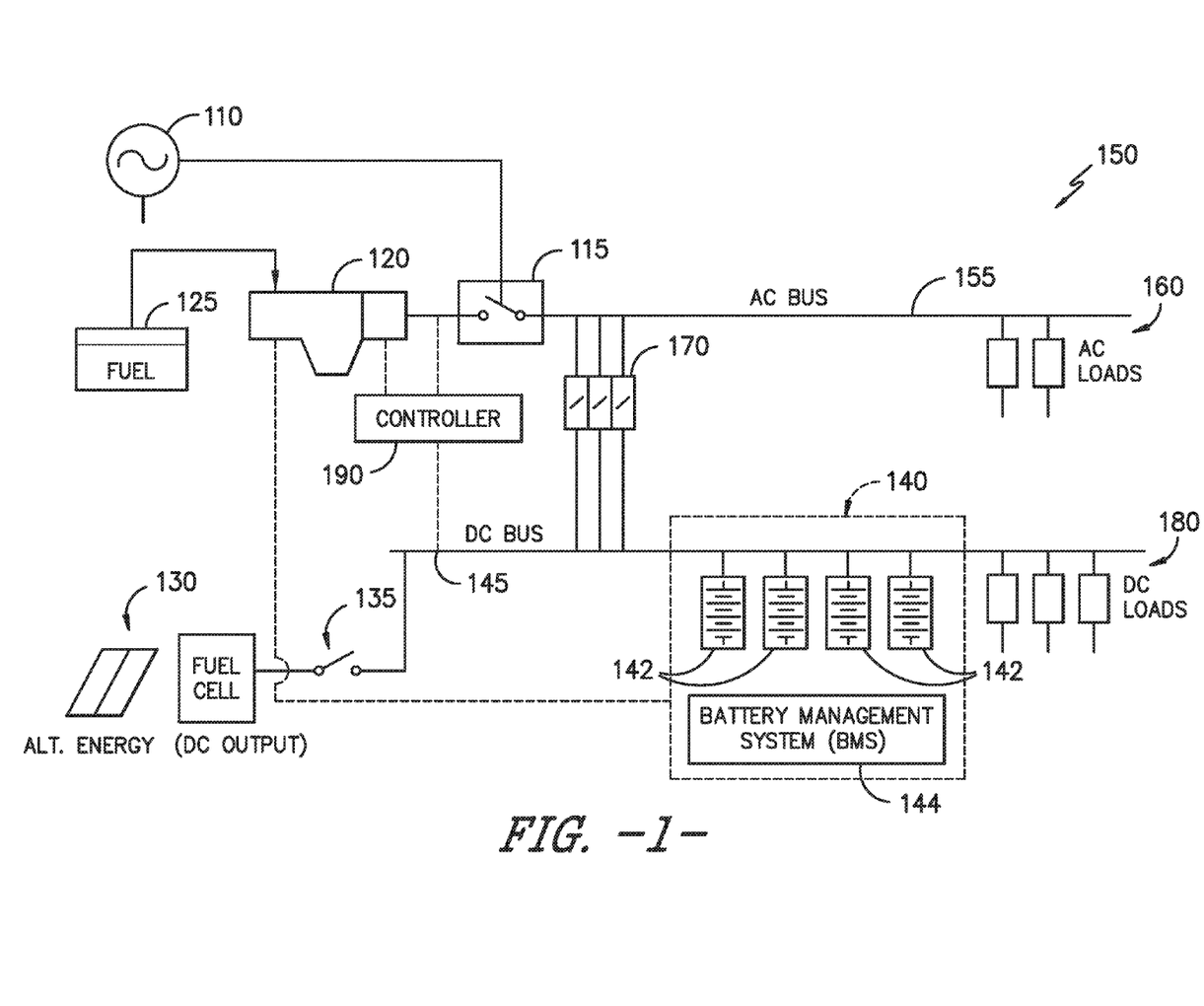
FIG. 1 illustrates a schematic diagram of one embodiment of an electrical power system according to the present disclosure.

Referring generally to the drawings, FIG. 1 is an illustration of one embodiment of a hybrid generator-battery power system 100 that may implement one or more energy storage systems according to the present disclosure. Thus, FIG. 1 is provided for illustrative purposes only and is not meant to limit the present disclosure to a particular application. Rather, the system and method of the present disclosure can be utilized in any power system. As shown in FIG. 1, the illustrated embodiment depicts multiple sources of power including an AC power grid, an engine-generator power source or engine-generator set (EGS) 120 and a battery power source 140, which is an energy storage system (ESS). A transfer switch 115 allows transfer of operation between the AC grid power and the EGS 120, as well as other AC electrical power that may be available. The EGS 120 typically runs on fuel (e.g., diesel fuel) provided by a fuel source 125 (e.g., a storage tank). An availability switch 135 allows for alternate energy sources 130 (e.g. solar, wind, or fuel cell), if available, to be switched in to a DC bus 145 or an AC bus 155 of the power system 100 as well. If switching into the AC bus 155, an inverter 170 (described below) can be coupled between the alternate energy source 130 and the AC bus 155.

The battery power source 140 is an electrical power source. More specifically, in certain embodiments, the battery power source 140 may include one or more energy storage devices or batteries 142. For example, the energy storage devices 142 may include lithium ion batteries, sodium nickel chloride batteries, sodium sulfur batteries, nickel metal hydride batteries, nickel cadmium batteries, fuel cells, super capacitors, or similar. In certain embodiments, sodium nickel chloride batteries are particularly suitable due to their high charge acceptance that can drive the EGS 120 to peak efficiency, thereby reducing fuel costs for the system 100. In addition, battery performance of sodium nickel chloride batteries, particularly its charge acceptance, is not affected by ambient temperature; therefore, such batteries can be used at sites with extreme temperature variations.

The AC bus 155 provides AC power to drive AC loads 160 of the system such as, for example, lighting and/or air conditioning for the system 100. Furthermore, the AC bus 155 can provide AC power to a rectifier 170 which converts AC power to DC power and provides the DC power to the DC bus 145 to drive DC loads 180 of the power system 100 such as the radios, switches, and amplifiers of the power system 100. The DC bus 145 also provides DC power from the rectifier 170 to recharge the battery power source 140 and provides DC power from the battery power source 140 to the DC loads 180 as the battery power source 140 discharges. A controller 190 may be configured to monitor and/or control various aspects of the system 100, such as commanding the engine of the EGS 120 to turn on or off in accordance with a control logic of the controller 190. In accordance with various embodiments, the controller 190 may be a separate unit or may be part of a battery management system (BMS) 144 of the battery power source 140.

The rectifier or regulator 170 may regulate DC power from a DC electrical power source (e.g., a solar energy system or a fuel cell energy system) instead of an AC electrical power source. The terms "rectifier" and "regulator" are used broadly herein to describe a device that conditions energy from a primary power source to provide DC electrical power to DC loads (e.g., DC loads 180) and to an ESD (e.g., the battery power source 140). In general, a primary power source may provide AC or DC electrical power that is used by an ESD (e.g., by the DC battery power source 140) of the power system 100.

During operation, when the EGS 120 is on, the EGS 120 provides power to the DC loads 180 and to the battery power source 140 during a charging part of the cycle. When the EGS 120 is off, the battery power source 140 provides power to the DC loads 180 during a discharging part of the cycle. The state of the battery power source 140 can be estimated by observations of the current of the battery power source 140.

Figure 2:
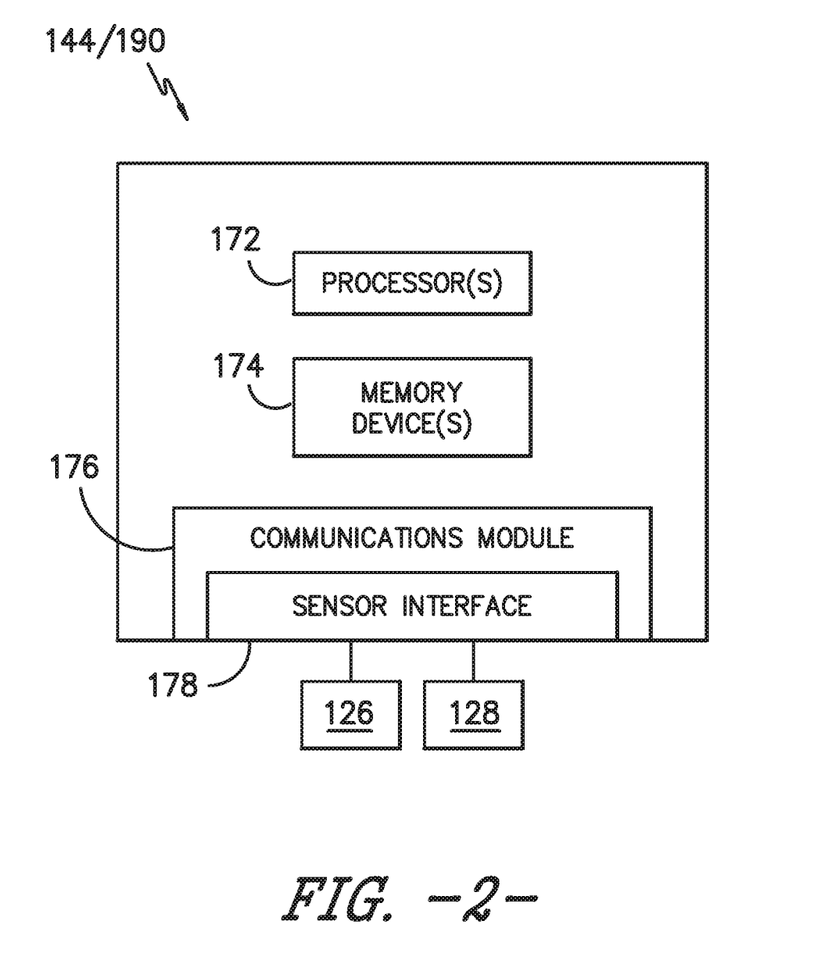
FIG. 2 illustrates a block diagram of one embodiment of suitable components that may be configured in a controller according to the present disclosure.

As shown particularly in FIGS. 1 and 2, the battery power source 140 may be controlled by the BMS 144. More specifically, FIG. 2 illustrates a block diagram of one embodiment of components that may be included in a controller (such as controller 190 or battery management system (BMS) 144) that can be part of the power system 100 of FIG. 1. For example, in several embodiments, the BMS 144 is configured to monitor and/or control operation of the battery power source 140. In addition, in accordance with the present disclosure, the BMS 144 may be configured to communicate with the EGS 120 by sending a start-up command to a starter battery 124 so as to start-up the engine of the EGS 120 in accordance with control logic of the BMS 144. The BMS 144 may also provide control logic for operation of any other components of the energy storage system 140. For example, the BMS 144 may be, for example, a logic controller implemented purely in hardware, a firmware-programmable digital signal processor, or a programmable processor-based software-controlled computer.

More particularly, as shown in FIG. 2, the BMS 144 (or the controller 190) can include any number of control modules. As shown, for example, the BMS 144 can include one or more processor(s) 172 and associated memory device(s) 174 configured to perform a variety of computer-implemented functions and/or instructions (e.g., performing the methods, steps, calculations and the like and storing relevant data as disclosed herein). The instructions when executed by the processor 172 can cause the processor 172 to perform operations, including providing control commands to the energy storage devices 142 and/or other aspects of the system 100. Additionally, the BMS 144 may also include a communications module 176 to facilitate communications between the BMS 144 and the various components of the system 100. Further, the communications module 176 may include a sensor interface 178 (e.g., one or more analog-to-digital converters) to permit signals transmitted from one or more sensors 126, 128 to be converted into signals that can be understood and processed by the processors 172. It should be appreciated that the sensors (e.g. sensors 126, 128) may be communicatively coupled to the communications module 176 using any suitable means. For example, as shown in FIG. 2, the sensors 126, 128 are coupled to the sensor interface 178 via a wired connection. However, in other embodiments, the sensors 126, 128 may be coupled to the sensor interface 178 via a wireless connection, such as by using any suitable wireless communications protocol known in the art. As such, the processor 172 may be configured to receive one or more signals from the sensors 126, 128.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 172 is also configured to compute advanced control algorithms and communicate to a variety of Ethernet or serial-based protocols (Modbus, OPC, CAN, etc.). Additionally, the memory device(s) 174 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 174 may generally be configured to store suitable computer-readable instructions that, when implemented by the processor(s) 172, configure the BMS 144 to perform the various functions as described herein.

Figure 3:
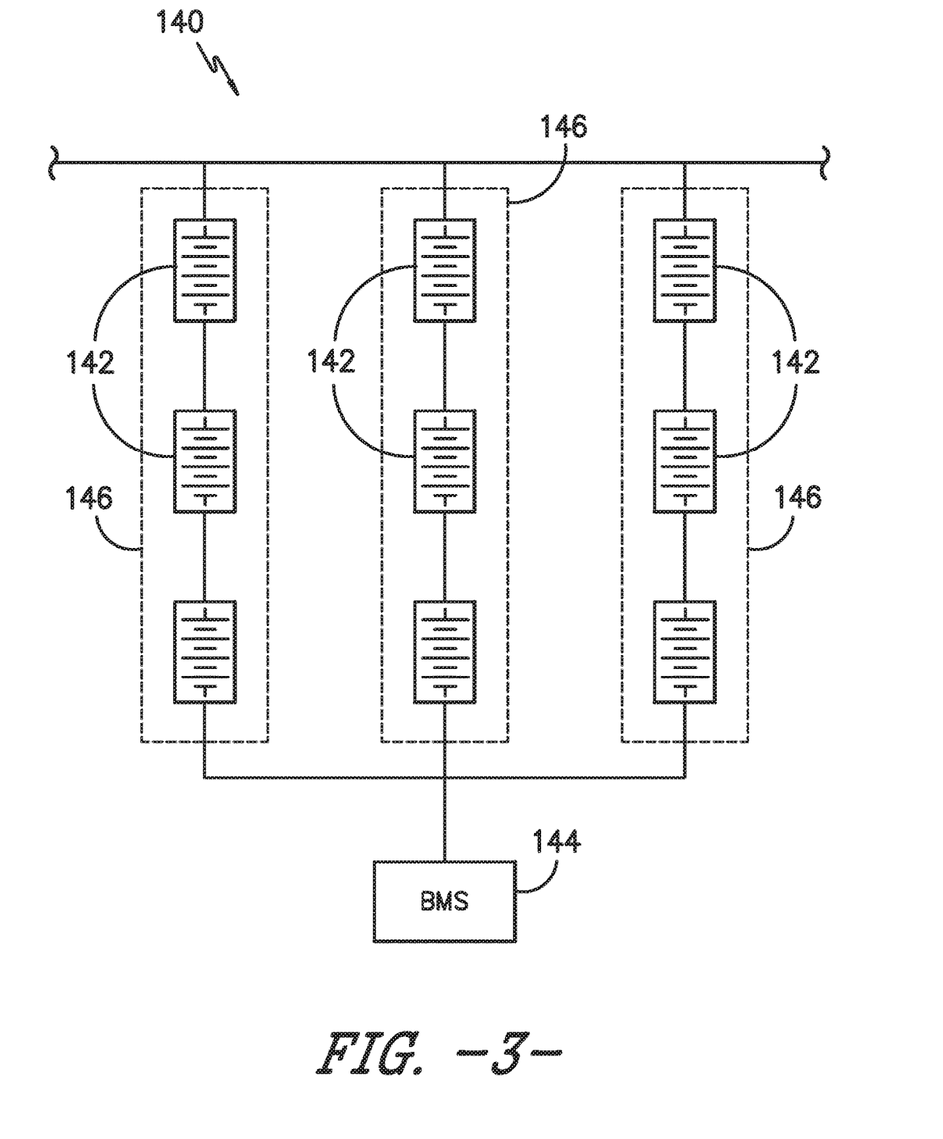
FIG. 3 illustrates a schematic diagram of one embodiment of an energy storage system configured to prevent over-current recharge or discharge of the parallel battery strings according to the present disclosure.

Referring now to FIG. 3, a schematic diagram of one embodiment of a battery power source 140 or energy storage system according to the present disclosure, e.g. that may be included in the power system 100 of FIG. 1, is illustrated. As shown, the energy storage system 140 includes a plurality of batteries 142 connected in series to form a plurality of battery strings 146. Further, as shown, the battery strings 146 are connected in parallel. In addition, the battery power source 140 includes a controller 144 communicatively coupled to the plurality of battery strings 146. More specifically, as shown, the controller 144 corresponds to the BMS as described herein.

Figure 4:
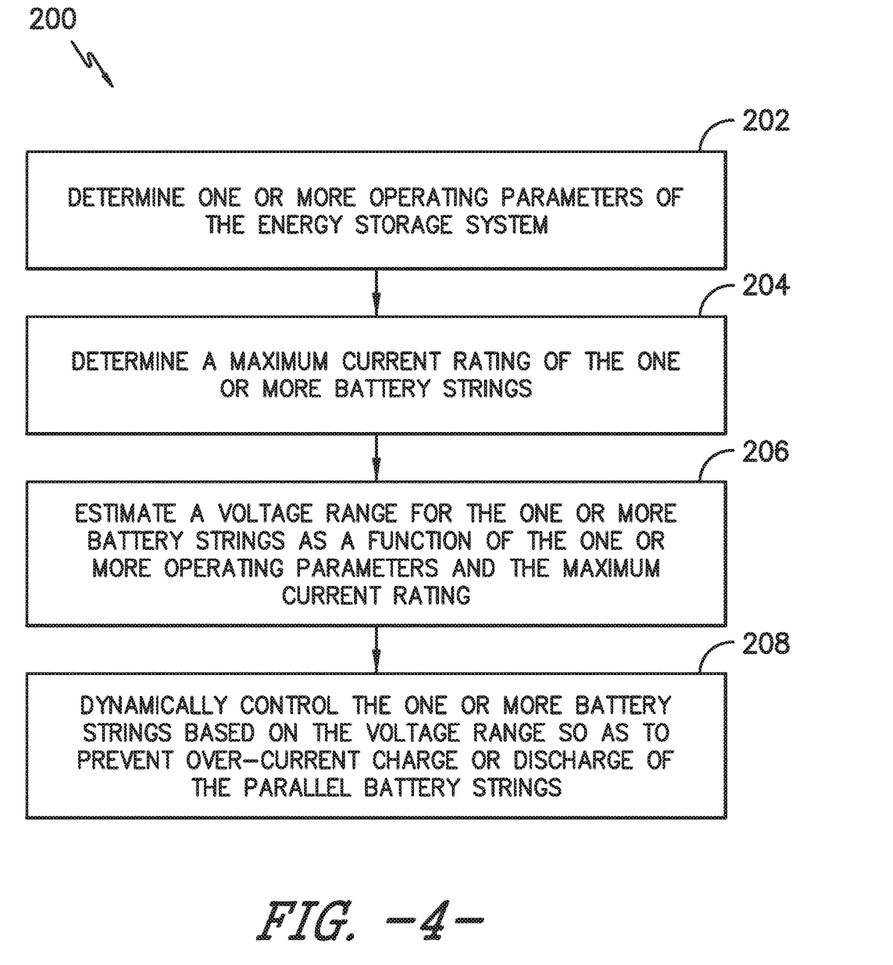
FIG. 4 illustrates a flow diagram of one embodiment of a method for controlling an energy storage system so as to prevent over-current recharge or discharge of the parallel battery strings according to the present disclosure.

As mentioned, the BMS 144 is configured to perform a variety of computer-implemented functions and/or operations. More specifically, as shown in FIG. 4, a flow diagram illustrating one embodiment of a method 200 that may be implemented by the BMS 144 is illustrated. As shown at 202, the method 200 may include estimating an open circuit voltage and a resistance of one or more of the battery strings 146. As used herein, "open circuit voltage" generally refers to the difference of electrical potential between two terminals of a device when disconnected from any circuit, i.e.

there is no external load connected between the terminals. In certain embodiments, the open circuit voltage and/or the resistance of the battery string(s) 146 may be estimated by using a multi-point interpolation model based on a state-of-charge (SOC) of one or more of the battery strings. In still further embodiments, any other suitable method may be used to estimate the open circuit voltage and/or the resistance of the battery string(s) 146, e.g. such as by calculating such values using known formulas.

As shown at 204, the method 200 may also include determining a maximum current rating of the one or more battery strings 146. For example, in one embodiment, the maximum current rating of the battery string(s) may be determined based on battery system constraints and/or wire ratings. More specifically, in certain embodiments, the battery system constraints may include a battery fuse rating, a conductor capacity, a battery rating, or similar.

Still referring to FIG. 4, as shown at 206, the method 200 may include estimating a voltage range for the battery string(s) 146 as a function of the one or more operating parameters and/or the maximum current rating. For example, in certain embodiments, the step of determining the voltage range for the battery string(s) may include determining a discharge voltage limit as a function of the open circuit voltage, the resistance, and the maximum current rating, and determining a recharge voltage limit as a function of the open circuit voltage, the resistance, and the maximum current rating. More specifically, in certain embodiments, the step of determining the discharge voltage limit (i.e. $V_{DL}$) as a function of the open circuit voltage, the resistance, and the maximum current rating may include multiplying the resistance by the maximum current rating to obtain a multiplied value, and subtracting the multiplied value from the open circuit voltage, e.g. as shown below with reference to Equation (1):

$$V_{DL} = V_{OCV} - I_{rating} * R \quad \text{Equation (1)}$$

Where $V_{OCV}$ is the open circuit voltage,
$I_{rating}$ is the maximum current rating, and
R is the resistance.

Similarly, the recharge voltage limit (i.e. $V_{CL}$) may be calculated as a function of the open circuit voltage, the resistance, and the maximum current rating by multiplying the resistance by the maximum current rating to obtain a multiplied value, and adding the multiplied value to the open circuit voltage, e.g. as shown below with reference to Equation (2):

$$V_{CL} = V_{OCV} + I_{rating} * R \quad \text{Equation (2)}$$

In further embodiments, the voltage range may be calculated using any other suitable model. For example, in addition to Equations (1) and (2) above, the voltage range may be determined using one or more lookup tables. More specifically, in certain embodiments, the lookup tables may include at least three columns, namely SOC, $V_{LIMH}$, and $V_{LIML}$. Thus, the voltage range may be estimated from the state-of-charge (SOC) of the energy storage system, e.g. using Equations (3) and (4) below:

$$V_{LIMU} = \text{LOOKUP(SOC)} \quad \text{Equation (3)}$$

$$V_{LIML} = \text{LOOKUP(SOC)} \quad \text{Equation (4)}$$

Where $V_{LIMH}$ is the upper limit voltage, and
$V_{LIML}$ is the lower limit voltage.

In additional embodiments, the voltage range may be calculated as a function of the open circuit voltage and one or more lookup tables, e.g. as shown in Equations (5) and (6) below:

$$V_{LIMU} = V_{OCV} + \text{LOOKUP(SOC)} \quad \text{Equation (5)}$$

$$V_{LIML} = V_{OCV} - \text{LOOKUP(SOC)} \quad \text{Equation (6)}$$

In yet another embodiment, the voltage range may be calculated using a dynamic model of voltage and current. More specifically, such a model is configured to receive operational inputs (e.g. voltage, current, temperature) to determine the voltage range from a maximum/minimum desired current. Thus, the model may be composed of one or more estimated parameters such as open circuit voltage, resistance, SOC, capacitance, inductance, or similar. The model parameters may be fixed (i.e. determined by analysis before run-time) or dynamic (i.e. learned and/or adjusted by the controller at run-time).

In still further embodiments, additional general purpose models and/or functions are suitable models that may be used by the controller to determine the voltage range. Further examples may include but are not limited to a trained neural network, kallman filters, or any other suitable functions.

Thus, as shown at 208, the method 200 may include dynamically controlling the battery string(s) 146 based on the voltage range so as to prevent over-current recharge or discharge of the parallel battery strings. For example, in certain embodiments, the step of dynamically controlling the battery string(s) 146 based on the voltage range may include dynamically adjusting a voltage range setting of the battery string(s) 146 based on the voltage range.

Figure 5:
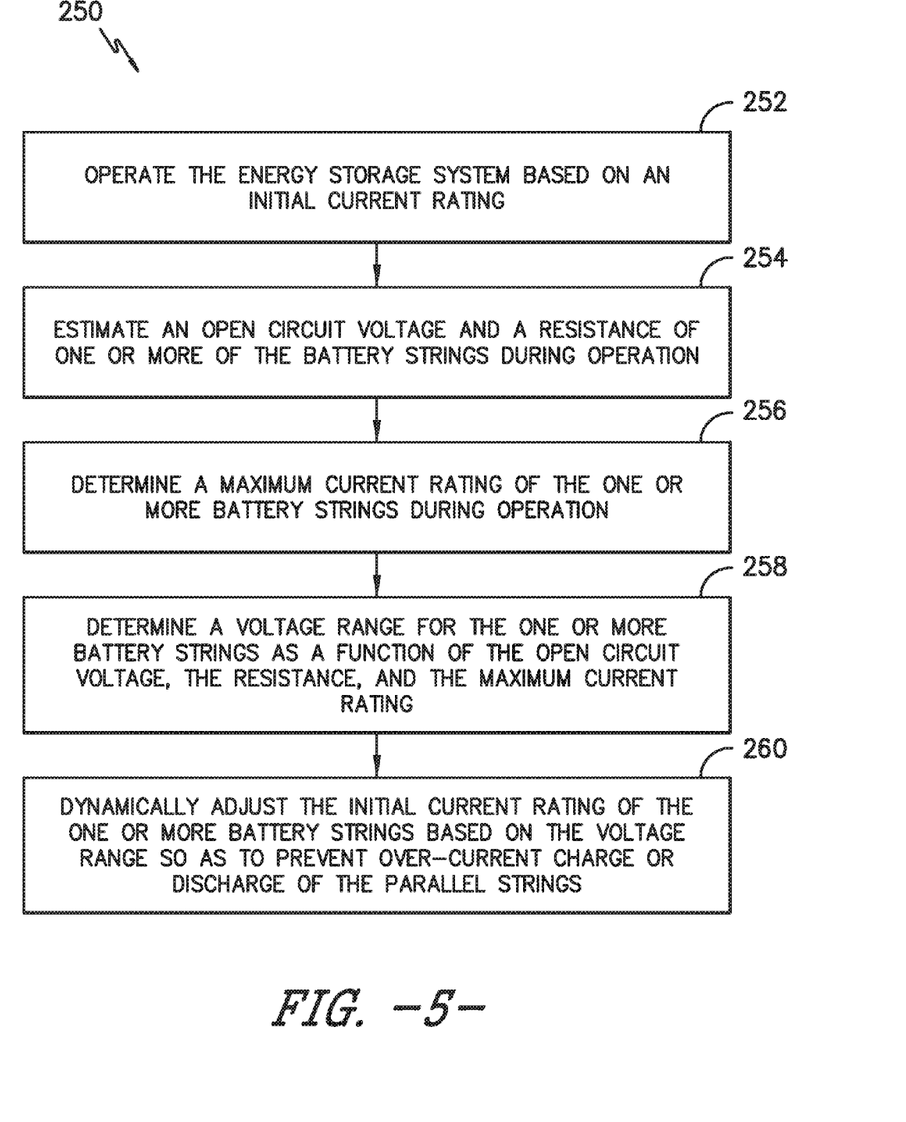
FIG. 5 illustrates a flow diagram of another embodiment of a method for controlling an energy storage system so as to prevent over-current recharge or discharge of the parallel battery strings according to the present disclosure.

Referring now to FIG. 5, a flow diagram of another embodiment of a method 250 for controlling an energy storage system (e.g. such as the battery power source 140 of FIG. 1) is illustrated. As mentioned, the energy storage system 140 includes a plurality of battery strings 146 connected in parallel with the battery strings 146 having a plurality of batteries 142 connected in series. Thus, as shown at 252, the method 250 includes operating the energy storage system 140 based on an initial current rating. As shown at 254, the method 250 include estimating, via the controller 144, an open circuit voltage and/or a resistance of one or more of the battery strings 146 during operation. As shown at 256, the method 250 includes determining, via the controller 144, a maximum current rating of the one or more battery strings 146 during operation. As shown at 258, the method 250 includes determining, via the controller 144, a voltage range for the one or more battery strings 146 as a function of the open circuit voltage, the resistance, and the maximum current rating. As shown at 260, the method 250 includes dynamically adjusting the initial current rating of the one or more battery strings 146 based on the voltage range so as to prevent over-current recharge or discharge of the parallel battery strings 146. It should be understood that the method 250 may further include any of the additional features and/or steps as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an energy storage system, the energy storage system having a plurality of battery strings connected in parallel, each of the battery strings having a plurality of batteries connected in series, the method comprising:
   when all of the plurality of battery strings are connected, constraining, via a controller, operation of the energy storage system based on a maximum current rating;
   determining, via the controller, one or more operating parameters of the energy storage system;
   in the event that one or more of the battery strings is disconnected from remaining battery strings of the energy storage system, estimating, via the controller, a voltage range for the one or more battery strings as a function of the one or more operating parameters and the maximum current rating; and
   dynamically adjusting a voltage range setting of the voltage range to cause a charge current or a discharge current to be equal to or less than the maximum current rating so as to prevent over-current recharge or discharge of the parallel battery strings.

2. The method of claim 1, wherein the operating parameters comprise an open circuit voltage and a series resistance.

3. The method of claim 2, wherein determining one or more operating parameters of the energy storage system further comprises estimating the open circuit voltage and the resistance of one or more of the battery strings using a multi-point interpolation model based on a state-of-charge (SOC) of one or more of the battery strings.

4. The method of claim 1, further comprising determining the maximum current rating of the one or more battery strings based on at least one of one or more battery system constraints or wire ratings.

5. The method of claim 4, wherein the battery system constraints comprise at least one of a battery fuse rating, a conductor capacity, or a battery rating.

6. The method of claim 2, wherein estimating the voltage range for the one or more battery strings as the function of the one or more operating parameters and the maximum current rating further comprises:
   determining a discharge voltage limit as the function of the open circuit voltage, the resistance, and the maximum current rating, and
   determining a recharge voltage limit as the function of the open circuit voltage, the resistance, and the maximum current rating.

7. The method of claim 6, wherein determining the discharge voltage limit as the function of the one or more operating parameters and the maximum current rating further comprises:
   multiplying the resistance by the maximum current rating to obtain a multiplied value, and
   subtracting the multiplied value from the open circuit voltage.

8. The method of claim 6, wherein determining the recharge voltage limit as the function of the open circuit voltage, the resistance, and the maximum current rating further comprises:
   multiplying the resistance by the maximum current rating to obtain a multiplied value, and
   adding the multiplied value to the open circuit voltage.

9. The method of claim 1, wherein the plurality of batteries comprise at least one of lithium ion batteries, sodium nickel chloride batteries, sodium sulfur batteries, nickel metal hydride batteries, nickel cadmium batteries, or fuel cells.

10. A method for controlling an energy storage system, the energy storage system having a plurality of battery strings connected in parallel, the battery strings having a plurality of batteries connected in series, the method comprising:
    when all of the plurality of battery strings are connected, operating the energy storage system based on an initial current rating;
    estimating, via a controller, an open circuit voltage and a resistance of one or more of the battery strings during operation;
    in the event that one or more of the battery strings is disconnected from remaining battery strings of the energy storage system, determining, via the controller, a voltage range for the one or more battery strings as a function of the open circuit voltage, the resistance, and the initial current rating;
    dynamically adjusting a voltage range setting of the voltage range to cause a charge current or a discharge current to be equal to or less than the initial current rating so as to prevent over-current recharge or discharge of the parallel battery strings.

11. The method of claim 10, wherein estimating the open circuit voltage and resistance of one or more of the battery strings further comprises estimating the open circuit voltage and resistance of one or more of the battery strings using a multi-point interpolation model based on a state-of-charge (SOC) of one or more of the battery strings.

12. The method of claim 10, further comprising determining the maximum current rating of the one or more battery strings based on at least one of one or more battery system constraints or wire ratings.

13. The method of claim 12, wherein the battery system constraints comprise at least one of a battery fuse rating, a conductor capacity, or a battery rating.

14. The method of claim 10, wherein determining the voltage range for the one or more battery strings as the function of the open circuit voltage, the resistance, and the maximum current rating further comprises:
    determining a discharge voltage limit as the function of the open circuit voltage, the resistance, and the maximum current rating, and
    determining a recharge voltage limit as the function of the open circuit voltage, the resistance, and the maximum current rating.

15. The method of claim 14, wherein determining the discharge voltage limit as the function of the open circuit voltage, the resistance, and the maximum current rating further comprises:
    multiplying the resistance by the maximum current rating to obtain a multiplied value, and
    subtracting the multiplied value from the open circuit voltage.

16. The method of claim 14, wherein determining the recharge voltage limit as the function of the open circuit voltage, the resistance, and the maximum current rating further comprises:
    multiplying the resistance by the maximum current rating to obtain a multiplied value, and
    adding the multiplied value to the open circuit voltage.

17. An energy storage system, comprising:
- a plurality of battery strings connected in parallel, each of the battery strings comprising a plurality of batteries connected in series,
- a controller communicatively coupled to the plurality of battery strings, the controller configured to perform one or more operations, the one or more operations comprising:
    - when all of the plurality of battery strings are connected, constraining operation of the energy storage system based on a maximum current rating;
    - determining one or more operating parameters of the energy storage system;
    - in the event that one or more of the battery strings is disconnected from remaining battery strings of the energy storage system, determining a voltage range for the one or more battery strings as a function of the open circuit voltage, the resistance, and the maximum current rating; and
    - dynamically adjusting a voltage range setting of the voltage range to cause a charge current or a discharge current to be equal to or less than the maximum current rating.

18. The system of claim 17, wherein the battery system constraints comprise at least one of a battery fuse rating, a conductor capacity, or a battery rating.

19. The system of claim 17, wherein the plurality of batteries comprise at least one of lithium ion batteries, sodium nickel chloride batteries, sodium sulfur batteries, nickel metal hydride batteries; nickel cadmium batteries, or fuel cells.

* * * * *